Patented Oct. 19, 1954

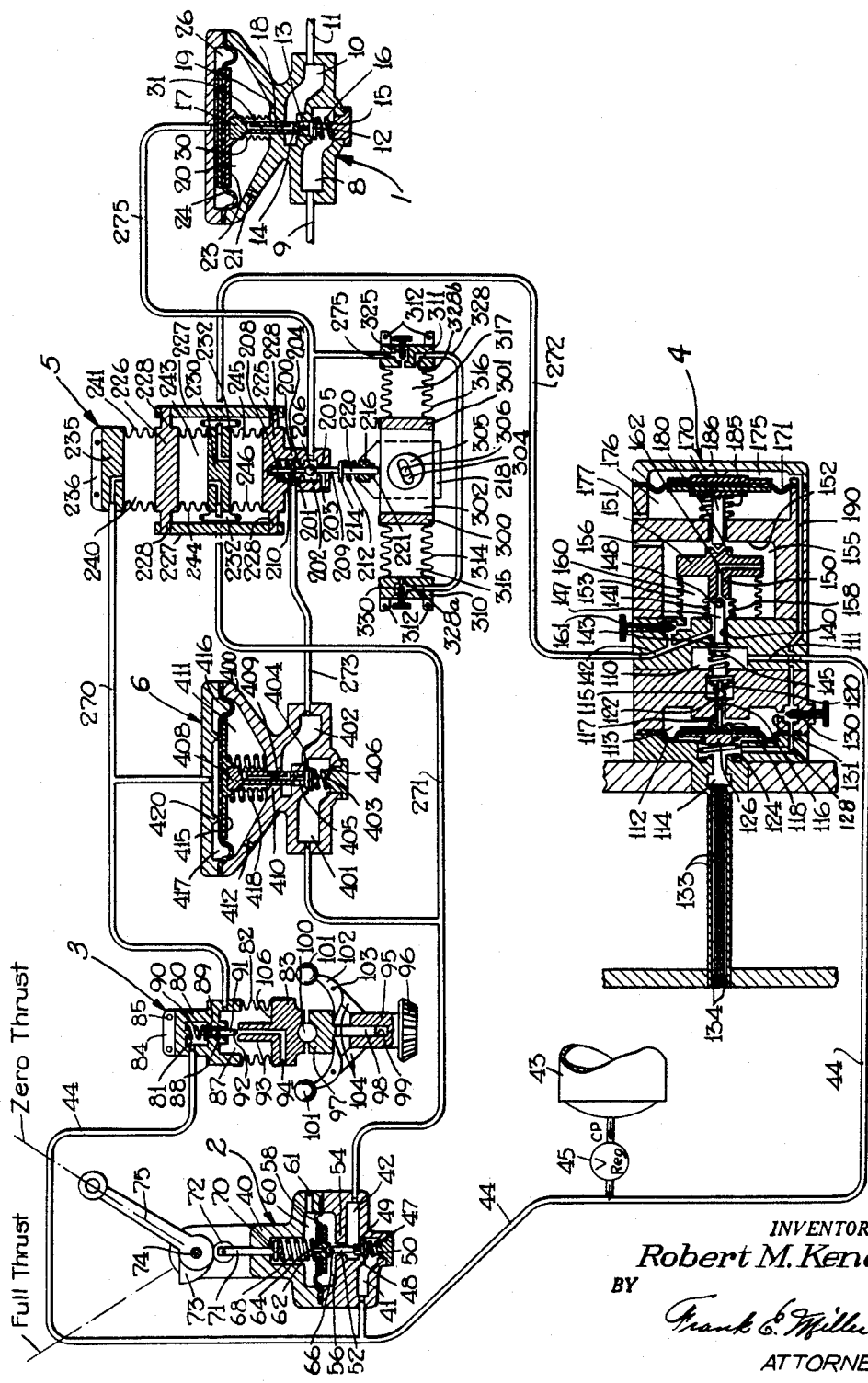

2,691,867

UNITED STATES PATENT OFFICE 2,691,867

FUEL CONTROL SYSTEM FOR TURBOJET ENGINES

Robert M. Kendig, Pittsburgh, Pa., assignor to Westinghouse Air Brake Company, a corporation of Pennsylvania Application April 25, 1950, Serial No. 157,909

7 Claims. (Cl. 60—39.28)

This invention relates to a fuel control system and more particularly to fluid pressure control apparatus for controlling thrust output from a gas turbo-jet engine.

A main object of the invention is the provision of control apparatus for a gas turbo-jet engine which can be operated to control the thrust output of such an engine according to position of an operator's control handle.

Another object of the invention is the provision of thrust control apparatus for a gas turbo-jet engine which will prevent overheating and overspeeding of the gas turbine comprised in such an engine.

Another object of the invention is the provision of a thrust control apparatus such as above defined which is extremely sensitive to changes in speed and temperature of operation of the gas turbine and rapidly responsive to small increments of such changes when same become critical.

Other objects and advantages of the invention will become apparent from the following more detailed description of the invention.

In the accompanying drawing, the single figure is a schematic representation, partly in outline and partly in section, of a fluid pressure fuel control apparatus embodying the invention.

Description

Referring to the drawing, the fluid pressure control apparatus comprises a fluid pressure fuel control valve device 1 for regulating supply of fuel to the gas turbine combustion chamber (not shown) in response to changes in pressure of fluid; an operator's control valve device 2 for regulating the pressure of fluid supplied to the fuel control valve device 1; a speed responsive control valve device 3 for modifying action of the fuel control valve device 1 to limit or reduce the amount of fuel to the gas turbine (not shown) when its speed tends to become excessive; a temperature sensitive valve device 4 for modifying action of the fuel control valve device 1 to so limit the amount of fuel to the gas turbine as to prevent its operating temperature exceeding a choosen high degree; an integrating valve device 5 for correlating response of the fuel control valve device 1 to operation of the operator's control valve device 2, the speed responsive valve device 3 and the temperature responsive valve device 4; and an interlock valve device 6 interposed between the fuel control valve device 1 and the operator's control valve device 2 to prevent supply of fluid under pressure from the latter to the former, thereby preventing supply of fuel to the gas turbine, until a certain starting speed of the turbine has been attained.

Description of fuel control valve device 1

The fuel control valve device 1 may comprise a casing having a fuel inlet chamber 8 formed therein which is adapted by means of a port and pipe 9 to be connected to a source of fuel supply (not shown), and having a fuel outlet chamber 10 formed therein which is adapted by means of a port and pipe 11 to be connected to such as injection nozzles (not shown) in the gas turbine combustion chamber. The fuel control valve device 1 further comprises a fuel control valve 12 disposed in chamber 8 and attached to a fluted stem 13 slidably disposed in a casing bore 14 which opens between said chamber 8 and the outlet chamber 10. The valve 12 is urged toward a seated position on a casing seat 15 in which it is shown in the drawing by action of a compression spring 16; the valve 12 when seated, closing communication between the chambers 8 and 10 via the bore 14. To act as a medium through which the valve 12 may be unseated and moved to various positions in proximity to the seat 15 for varying the amount of flow of fuel through the bore 14, hence to the turbine, a stem 17 is provided. The stem 17 is attached at its one end to the fluted stem 13, thereby to the valve 12, and projects through an accommodating bore 18 opening through a casing partition 19 which separates the fuel outlet chamber 10 from a chamber 20 which is constantly open to the atmosphere by way of a port 21 in the casing. In the chamber 20, the stem 17 is attached centrally to a diaphragm follower 23 which is secured for movement with deflection of a diaphragm 24 clamped at its outer periphery between two portions of the casing. The diaphragm 24 is subject opposingly to atmospheric pressure in the chamber 20 at its one side and to pressure of fluid in a control chamber 26 on its opposite side.

Operation of fuel control valve device 1

In response to pressure of fluid supplied to the chamber 26, the diphragm 24 will be displaced in the direction of chamber 20 an amount according to the degree of such pressure, with consequent unseating and movement of the valve 12, through stem 17, away from the seat 15 a distance according to displacement of the diaphragm and hence also to the degree of pressure in chamber 26 for correspondingly increasing the flow of fuel between chambers 8 and 10 via the bore 14. Subsequent reduction in pressure of fluid in the control chamber 26 will allow the spring 16 to move the valve 12 accordingly to positions approaching its seat 15 for correspondingly reducing the amount of fuel which may flow from chamber 8 to chamber 10 by way of the bore 14. With a source of fuel at constant pressure supplied to the chamber 8, the amount of fuel which will flow therefrom to the chamber 10, hence to the gas turbine combustion chamber, will be varied according to variation in pressure of fluid in the control chamber 26. A certain minimum pressure in the control chamber 26 will call for zero fuel flow through the fuel control valve device, and a certain maximum pressure will call for a corresponding maximum flow of fuel through said device. Proportionate increase or reduction in pressure of fluid in the control chamber 26 between the above limit pressures will cause proportionate increase or reduction in the amount of fuel allowed by the fuel control valve device to flow to the turbine combustion chamber.

In the fuel control valve device 1, to allow for facile movement of the stem 17 and thereby insure sensitivity of response of the device to variations in pressure of control fluid in chamber 26 and to balance off the pressure of fluid in chamber 26, as will be described subsequently, the stem 17 is fit loosely in the bore 18 through which it extends and a bellows 30 is provided which encircles that portion of the stem 17 that extends into the chamber 20. One end of the bellows 30 is secured and sealed to the partition 19 encircling one end of the bore 18 while the opposite end of the bellows is secured and sealed to the follower 23. A passage 31 extends longitudinally of the stem 17, opening at its opposite ends into the interior of bellows 30 and into the fuel outlet chamber 10 so that fuel may flow easily into and out of the bellows 30 from and to chamber 10 during reciprocable movement of the stem 17. The size of the passage 31 in stem 17 may be such as will facilitate flow of fuel therethrough; however, should the device tend to oscillate, a choke (not shown) in this passage might be provided to dampen the oscillation.

During operation of the fuel control valve device 1 in response to variations in pressure of fluid in its control chamber 26, the pressure of the fuel which reaches the delivery chamber 10 and bellows 30 will be proportionate to the amount of fuel flowing to such chamber 10, and such pressure within bellows 30 will act on stem 17 and therefore diaphragm 24 in opposition to pressure in the control chamber according to amount of fuel flowing and hence to position of the valve 12. Such pressure of fuel within the bellows 30 together with aid of spring 16 will act to balance off pressure in the control chamber 26 to establish a desired position of the valve 12 relative to seat 15 as will allow the flow of fuel to the delivery chamber 10 in amount commensurate with the degree of control pressure.

*Description of operator's control valve device 2*

The operator's control valve device 2 may comprise a casing 40 having supply chamber 41 and a delivery chamber 42 formed therein. The supply chamber 41 is connected to a source of fluid under pressure, such as a reservoir 43, by way of a fluid pressure supply pipe 44 and a constant pressure outlet valve 45. The reservoir 43 may be supplied with fluid under pressure from such as a fluid compressor (not shown). The constant pressure outlet valve 45 will maintain pressure of fluid in supply pipe 44 at a chosen constant value and less than the pressure in the reservoir. The delivery chamber 42 in device 2 is connected to a pipe 271 to convey fluid under pressure thereto and therefrom, for reasons which will hereinafter become apparent.

A supply valve 47 is provided in the device 2 for controlling communication between the chambers 41 and 42 by way of a bore extending through a casing partition 48 which separates chamber 41 and 42. The valve 47 is attached to a fluted stem 49 which is slidably disposed in the bore in partition 48. Stem 49 acts to guide reciprocable movement of valve 47 and allow for flow of fluid under pressure from chamber 41 to chamber 42 when said valve is unseated. A compression spring 50, disposed in chamber 41, is arranged to urge valve 47 toward a seated position in which it is shown in the drawing for closing off communication between chambers 41 and 42 via the bore in partition 48. To act as medium through which the valve 47 may be actuated to an open position, a stem 52 attached at its one end to fluted stem 49 is provided. The stem 52 extends from the fluted stem 49 through a portion of chamber 42 and an opening in a casing partition 54 which separates the delivery chamber 42 from a diaphragm control chamber 56. The opening in partition 54 through which the stem 52 extends is of such size as will allow considerable clearance area for flow of fluid under pressure to and from chambers 42 and 56. A resilient diaphragm 58 is clamped at its outer edge between sections of the casing 40 to define a flexible central portion which separates the chamber 56 from an exhaust chamber 60 which is constantly open to atmosphere by way of a port 61 in the casing. The diaphragm 58 is provided with an exhaust opening 62 formed in a seat member 64 secured for movement with deflection of the diaphragm by an arrangement of diaphragm follower members. The exhaust opening in member 64 is disposed opposite to the projecting end of the stem 52 which is tapered to fit an accommodating seat formed in said member at the respective end of said opening. The tapered end of stem 52 constitutes an exhaust valve 66 for controlling release of fluid under pressure from the chamber 56 by way of the opening in member 64 and chamber 60. The diaphragm 58 is subject opposingly to pressure of fluid in the chamber 56 and to force of a control spring 68 disposed in chamber 60. An adjustable spring seat 70 is provided to accommodate one end of the spring 68. The seat 70 is attached to a stem 71 slidingly extending outwardly of the casing through an opening therein. An outer projecting end of stem 71 is provided with a roller follower 72 which is urged into engagement with a cam 73, pivotally connected, by means of a pin 74, to an outwardly projecting arm formed in the casing. An operator's handle 75 is attached to the cam 73 for effecting rocking movement of same about the pin 74 to cause reciprocable movement of the stem 71 and attached spring seat 70.

*Operation of operator's control valve device 2*

In operation of the operator's control valve device 2, with chamber 41 therein charged with fluid at a pressure determined by the constant pressure outlet valve 45, when the operator's handle 75 is in the position in which it is shown in the drawing, titled "Zero Thrust" for example, the seat 70 attached to stem 71 will be so positioned that initial compression of spring 68 will be at a minimum, the member 64 carried by diaphragm 58 will be disposed away from the exhaust valve 66, so that chamber 56 and hence the delivery chamber 42 and pipe 27! will be vented to atmosphere by way of the opening in said member 64, the chamber 60, and port 61, and the supply valve 47 will be seated by action of the spring 50. Movement of the handle 75 to positions in the direction of and including a "Full Thrust" position, indicated by a dot-and-dash line so titled in the drawing, will cause movement of the stem 71 inwardly of the casing respective distances according to the degree of handle movement, carrying the spring seat 70 with it. It will be seen, therefore, that the respective end of the spring 68 will be advanced in the direction of the diaphragm 58 along with the seat 70 carried by stem 71. Initial movement of the spring seat 70 as above will carry spring 68 with it as the member 64 is caused to seat on the exhaust valve 66, thus closing off the chamber 56, hence the delivery chamber 42 from the exhaust chamber 60. Subsequent movement of the spring seat 70 as above, will cause, through resultant compression of the spring 68 and through the medium of stems 52 and 49, unseating of the supply valve 47 against action of the spring 50. Fluid under pressure from the chamber 41 then will flow by way of the unseated valve 47 into the chamber 42 and by way of the opening in the partition 54 into chamber 56. As a result of such flow thereto, the pressure of fluid in the chamber 56 increases and, with the aid of the spring 50 it will overcome the compressive force of the sping 68 and effect movement of the diaphragm 58 and thereby member 64 in the direction of chamber 60 until the valve 47 is seated by spring 50, whereupon further increase in pressure thereby will be terminated. The pressure at which the valve 47 will thus close will depend upon the degree of compression of the spring 68, which in turn is dependent upon position of the seat 70, which is in turn dependent upon the degree of depression of stem 71, which is dependent upon the position of the cam 73, which lastly, is dependent upon position of the handle 75. Thus it will be seen that for any particular position of the handle 75 there will be a particular pressure established in the delivery chamber 42 at the time the supply valve 47 seats. The pressure of fluid thereby established in the chamber 42 will increase from a minimum to a maximum as the handle 75 is moved from its "Zero Thrust" position to its "Full Thrust" position. Conversely, it will be understood that movement of the handle 75 from its "Full Thrust" position to its "Zero Thrust" position will effect decrease in pressure of fluid in the chamber 42 from a maximum to a minimum, respectively. The relationship between movement of the handle 75 and pressure in chamber 42 is determined by the profile which the cam 73 is given; such profile will be described in more detail hereinafter.

Description of speed control valve device 3

The speed responsive valve device 3 may comprise a casing portion 80 having formed therein a fluid pressure supply chamber 81 connected to a branch of the fluid pressure supply pipe 44, so that said chamber will be constantly charged with fluid at constant pressure. A bellows 82 connects the casing portion 80 with a casing portion 83. The casing portion 80 is adapted to be fixed relative to casing portion 83; a mounting flange 84 being attached to portion 80 which is provided with bolt holes 85 to allow for securing the flange to a fixed member of such as a turbo-jet engine. By longitudinal collapse and expansion of the bellows 82, the casing portion 83 freely may be moved toward and away from the casing portion 80. A fluid pressure delivery chamber 87 is defined by the inner wall of the bellows 82 between casing portions 80 and 83. A bore 88 formed in casing portion 80 extends between the supply chamber 81 and the delivery chamber 87. A supply valve 89, disposed in the supply chamber 81, is provided to control communication between said supply chamber and the delivery chamber 87 by way of the bore 88. A tapered seat is formed in casing portion 80 encircling the respective end of the bore 88 to accommodate the supply valve 89 when seated. A compression spring 90, disposed in chamber 81, is arranged to urge the supply valve 89 toward its seated position, in which it is shown in the drawing, for closing off the supply chamber from the bore 88. A stem 91 attached to the supply valve 89 extends through the bore 88 and projects into the delivery chamber 87; the projecting end of the stem being conical in shape to serve as an exhaust valve 92. An exhaust valve seat element 93 projects from the casing portion 83 into the chamber 87 in alignment with the exhaust valve 92. An exhaust passage 94 extends from an opening at the projecting end of the seat element 93 into casing portion 83 where it extends outwardly terminating at an opening to the atmosphere. A tapered annular exhaust valve seat is formed in the projecting end of the seat element 93 encircling the open end of exhaust passage 94 to accommodate the exhaust valve 92. To actuate the valves 89 and 92 according to speed of the gas turbine in the turbo-jet engine, fly-ball type of mechanism is provided, which, for sake of illustration, may comprise a head 95 adapted to be connected for rotation with the gas turbine through such as a gear 96. A collar element 97 is provided which has an attached stem 98 reciprocably and rotatably disposed in an accommodating bore 99 in the head 95. The casing portion 83 is adapted to be actuated by reciprocable movement of the element 97 through the medium of such as a ball thrust bearing 100 which will allow element 97 to rotate with ease relative to portion 83. Accommodating sockets in the element 97 and portion 83 provide for disposition and retention of the bearing 100. For actuating the collar element 97 and thereby the head portion 83 fly-ball weights 101 are provided. Each weight 101 is attached to one end of a respective arm 102 which is pivotally connected by means of a pin 103 to a respective projecting element 104 attached to the head 95. The opposite end of each arm 102 slidably engages a face of the collar element 97. Arrangement of weights 101 and arm 102 is such that rotation of the weights with the head 95 will cause the arms to exert a force on the collar element which will urge same toward casing portion 83.

Operation of speed control valve device 3

In operation of the speed responsive valve device 3, when the supply chamber 81 is charged with fluid under pressure and the head 95 is being rotated by the gas turbine, corresponding rotation of the weights 101 will cause a centrifugal force to be generated which the arms 102 will transmit to a face on the collar element 97 proportional to the speed of such rotation. The force thus transmitted to the collar element 97 will cause the casing portion 83 to move in the direction of chamber 87, seating the exhaust valve 91, thereby closing off the chamber 87 from the atmosphere, and then unseating the supply valve 89. Fluid under pressure from the supply chamber 81 will then flow past the unseated supply valve 89, through the bore 88, into the chamber 87 where the pressure condition therein will thus be increased. The increasing pressure of fluid in the chamber 87 will act on an exposed face 106 of the casing portion 83, thereby generating a force acting thereon which opposes the centrifugal force transmitted by the arms 102 acting on the collar element 97. When the pressure force acting on the body portion 83 substantially equals the centrifugal force acting on the collar element 97, the spring 90 will seat the supply valve 89 while the exhaust valve 92 remains seated on the seat element 93, thereby closing off the delivery chamber 87 from the supply chamber 81 while the former remains closed to the exhaust passage 94. During such closure of the supply valve 89, through extension of the bellows 82, the body portion 83 and collar element 97 will move in a direction in which stem 98 moves inwardly of the bore 99 a distance sufficient to allow for seating of said supply valve. The pressure of the fluid thus held in the delivery chamber 87 will be proportional to the speed of rotation of the head 95, hence of the gas turbine to which the head is assumed to be driven, since such pressure causes closure of the supply valve 89 when it balances the opposing centrifugal force acting on collar element 97, which force is proportional to the speed of rotation of the head 95. A decrease in speed of rotation of the head 95, reflecting a decrease in speed of rotation of the gas turbine, will proportionately reduce the centrifugal force exerted by arms 102 on the collar element 97, whereby the force of the pressure of fluid in the chamber 87 acting on body portion 83 will become preponderant over the above-mentioned centrifugal force and move the body portion 83 and collar element 97 in the direction of the head 95, carrying seat element 93 away from the exhaust valve 92, whereupon some fluid under pressure will flow from the chamber 87 by way of passage 94 until the pressure of such fluid in chamber 87 becomes reduced to a degree which will substantially balance the centrifugal force on collar element 97 whereupon seat element 93 will move against exhaust valve 92 to hold the pressure of fluid in chamber 87 at its new value corresponding to the reduced speed of the head 95. It will thus be seen that in the speed responsive valve device 3 the pressure of fluid in its delivery chamber 87 will be maintained at a pressure proportional to the speed of rotation of the head 95, hence of the gas turbine, for example, to which it is operably connected.

*Description of temperature sensitive valve device 4*

The temperature sensitive valve device 4 comprises a pneumatic pyrometer to provide fluid at a pressure directly proportional to the temperature of the hot expansible gases being supplied to the gas turbine, and an anticipating relay valve means for controlling a fluid pressure communication between the pneumatic pyrometer and the integrating valve device 5 and for anticipating changes in pressure in the pyrometer, for reasons which will hereinafter become obvious.

The pneumatic pyrometer comprises a casing having a fluid pressure supply chamber 110 formed therein which is adapted to receive fluid under pressure from such as a branch of the pipe 44 by way of a casing passage 111. A resilient diaphragm 112 is provided, clamped at its outer periphery between two portions of the casing. The diaphragm 112 is subject opposingly to pressure of fluid in a chamber 113 at one side and to pressure of fluid in a chamber 114 at its opposite side. A supply valve 115 is provided, disposed in the supply chamber 110 for controlling communication through a casing bore 116 extending from said supply chamber to the chamber 113. The valve 115 is operably connected to the diaphragm 112 through the medium of a stem 117 extending through the bore 116. One end of the stem 117 is attached to the valve 115 while the opposite end rockably rests in a follower element 118 carried by the diaphragm. A tapered coil spring 120 disposed in the supply chamber 110 is arranged to urge the stem 117 into engagement with the follower element 118. The diameter of the stem 117 is considerably less than the diameter of the bore 116 to allow for flow of fluid under pressure in the clearance space therebetween while at the same time allowing for self-alignment of the valve 115. The tapered spring 120 abuts a casing shoulder at its larger end and abuts the valve 115 at its opposite end so that the valve is thereby centered relative to an opening 122 of the bore 116 which opens into the chamber 110. Proximity of the valve 115 to the opening 122 determines the flow area which will be available to the fluid under pressure in chamber 110 for flow through bore 116 into chamber 113. A compression spring 124, disposed in the chamber 114, is arranged to bias the diaphragm 112 in the direction of chamber 113. One end of the spring 124 is located in an annular recess formed in the casing while its opposite end abuts a diaphragm follower 125 which is provided with a central projecting portion around which the respective end of the spring fits for location thereby. A passage 128 communicates between the chambers 113 and 114 for conveying fluid under pressure from the former to the latter. A needle valve 130 is provided in passage 128 to regulate the volume of fluid under pressure which may flow from chamber 113 to chamber 114. Needle valve 130 is attached to a stem in screw-threaded attachment with the casing and projecting outwardly thereof. The outer end of the stem may be turned manually to advance or withdraw the needle valve 130 into and out of an opening 131 which forms a part of passage 128 at its junction with chamber 113. The area presented to fluid under pressure from chamber 113 for flow to chamber 114 may thus be carefully adjusted for reasons which will hereinafter become obvious.

In order to sense the temperature of a medium such as the hot expansible gases of the gas turbine, as a chosen example, capillary tube or tubes 133 attached to the casing are provided for projection into the path of flow of such gases. The tubes 133 provide continuous restricted passages 134 which open the chamber 114 to the atmosphere. In the case of hot expansible gases at high velocity and pressure, the tubes 133 should be arranged to extend into the path of travel of such gases with arrangement made for the ends of the tubes to discharge to atmosphere. The tubes 133 are constructed of heat resistant material in order to withstand the hot combustion gases and are of sufficient strength to withstand shock and vibration caused by the hot gases passing over them at high velocity. A tube (not shown)) of larger internal diameter provided with a choke at its outer projecting end might be substituted for the plurality of smaller tubes 133.

*Operation of above described portion of temperature sensitive device 4*

In operation of the pneumatic pyrometer portion of the device 4, with the supply chamber 110 connected to a source of fluid at a substantially constant pressure and with the tubes 133 extending through the path of flow of hot expansible gases entering the gas turbine, and with the valve 115 disposed a distance away from opening 122, fluid under pressure from the supply chamber 110 will flow via the unseated valve and the bore 116 into the chamber 113. With the needle valve 130 disposed a certain distance away from opening 131, fluid under pressure supplied to chamber 113 will flow by way of such opening and the passage 128 into the chamber 114, from which a leak to atmosphere will occur by way of passages 134 in tubes 133. According to a feature of the invention, with the constant bias imposed on the diaphragm 112 by the spring 124, the pressure of fluid in the chamber 113 will be maintained at a certain constant value greater than any pressure which may exist in the chamber 114; that is through deflection of diaphragm 112 and thereby movement of valve 115, greater or lesser amounts of fluid under pressure from the supply chamber 110 will flow into chamber 113, as necessary to maintain the constant pressure differential across needle valve 130 between chambers 113 and 114 against the leak to atmosphere through tubes 133. By virtue of the constant differential in pressure thus maintained between chambers 113 and 114, for any given adjusted position of the needle valve 130, the volume of fluid flowing from chamber 113 via said needle valve into chamber 114 thence to atmosphere by way of tubes 133 will be constant during equal time intervals. Pressure of fluid in tubes 133, hence in chamber 113, will be directly proportional to the temperature of such fluid, which temperature will depend upon and indicate the temperature of the hot expansible gases to be admitted to the gas turbine, in the present instance. By employment of such a constant volume of flow through tubes 133 to reflect the variations in temperature of a medium, much faster response to such variations in temperature is attained in chamber 113 in form of corresponding pressure variations than can be attained by employment of a constant volume of static fluid contained in a closed bulb due, it is believed, to a lesser heat capacity, a greater area exposed to the hot gases, and certainly to a greater heat transfer coefficient. The constant volume flow method thus affording pressure variations directly proportional to changes in temperature being sensed simplifies calibration of the device and greatly reduces error over previous pneumatic pyrometers of a variable flow type in which pressure varied approximately as the square root of the temperature, introducing possibility of considerable error at the higher temperatures where equal increments in temperature change produce increasingly greater increments in resultant pressure change.

*Description of relay portion of temperature sensitive device 4*

The anticipating relay portion of the device 4 comprises a casing secured to the casing of the pyrometer portion in such fasion that the supply chamber 110 is common to both and provides a compact assemblage. A bore 140 in the casing is provided to communicate between the supply chamber 110 and a delivery chamber 141 which is constantly open to a fluid pressure control passage 142 formed in the casing. A supply valve 143 is disposed in the supply chamber 110 for controlling communication between said supply chamber and the delivery chamber 141 by way of the bore 140. A tapered seat is formed in the casing around the end of bore 140 opening into the chamber 110 to accommodate the supply valve 143. A compression spring 145 disposed in the supply chamber 110 is arranged to urged the supply valve 143 toward a seated position in which it is shown in the drawing. A stem 147 of lesser diameter than the diameter of the bore 140 through which it extends is attached at its one end to the supply valve 143 to act as a medium through which same may be unseated against action of spring 145. The opposite end of the stem 147 is disposed in the delivery chamber 141 and is tapered to form an exhaust valve 148. An exhaust valve seat element 150, disposed opposite to and in alignment with the exhaust valve 148, is provided, attached at its one end to a movable abutment 151 disposed within a cavity 152 formed in the casing. The movable abutment 151 is reciprocably connected to the casing through attachment at its outer peripheral edge to one end of a bellows 153, the opposite end of which is attached to the casing at one end of cavity 152. A fluid pressure exhaust chamber 155 is defined by the inner wall of cavity 152, exteriorly of the movable abutment 151, and bellows 153. Exhaust chamber 155 is constantly open to the atmosphere by way of an exhaust port 156 opening outwardly through the casing. A bellows 158 is attached at its one end to a projecting end of seat element 150 and at its opposite end to the casing encircling the opening to the bore 140. The bellows 158 allows for reciprocable movement of the seat element 150 along with abutment 151 and defines an outer wall of the delivery chamber 141 and an inner wall of an annular bellows chamber 160 within bellows 153 between a left-hand end wall of cavity 152 and one face of the abutment 151. The bellows chamber 160 is constantly open to the control passage 142 by way of a needle valve 161 which is adjustable exteriorly of the casing to vary the area available for flow of fluid under pressure between passage 142 and the bellows chamber 160. An exhaust passage 162, opening into the exhaust chamber 155 through the abutment 151, extends longitudinally through the seat element 150 to an opening disposed opposite to the exhaust valve 148. A tapered seat is formed in the projecting end of the seat element 150 to accommodate the exhaust valve 148.

For actuating the seat element 150 and thereby stem 147 and supply valve 143 a stem 170 is provided which is attached to a resilient diaphragm 171 by means of the usual diaphragm follower elements suitably attached thereto. The diaphragm may be suitably clamped at its periphery between two portions of the casing and is subject opposingly to pressure of fluid in a control chamber 175 at one side and to pressure of fluid in a chamber 176 at its opposite side which latter chamber is constantly open to atmosphere via such as a port 177. A casing partition separates chamber 155 from chamber 176 and an opening is provided therein through which the stem 170 extends with clearance. A socket 180 is formed in one face of the abutment to receive the end of the stem 170 which is rounded or tapered to fit the socket to assure transmission of thrust to the abutment when in engagement therewith. A compression spring 185, disposed in chamber 176 is arranged to bias the diaphragm 171 in the direction of chamber 175 toward a rest position in which it is shown in the drawing and in which the respective diaphragm follower abuts a centrally projecting tip of a portion of the casing forming an end wall 186 of the control chamber 175. In rest position of the diaphragm 171, the projecting end of stem 170 connected thereto will be disposed a short distance away from the abutment 151. The control chamber 175 in the anticipating relay portion of the device 4 is constantly open by way of a casing passage 190 to the chamber 114 in the pneumatic pyrometer portion of the device. It will be seen, therefore, that pressure of fluid in the control chamber 175 will be the same as that existing in chamber 114 and will therefore be directly proportional to temperature of the capillary tubes 133, hence to the temperature of the hot gases entering the gas turbine.

*Operation of relay portion of temperature sensitive device 4*

In operation of the anticipating relay portion of the device 4 in conjunction with the pneumatic pyrometer portion, until the pressure of fluid in the control chamber 175 attains a value sufficient to overcome the bias of the spring 185, the diaphragm 171 will remain in its rest position with the stem 170 out of engagement with the abutment 151 which will be in the position in which it is shown in the drawing with seat element 150 out of contact with the exhaust valve 148, and the supply valve 143, therefore, will be in its seated position in which it is shown in the drawing. With the supply valve 143 closed, fluid under pressure in the supply chamber 110 cannot reach the delivery chamber 141 and with the exhaust valve 148 open said delivery chamber will be vented to atmosphere by way of the passage 162 in seat element 150 and attached abutment 151, exhaust chamber 155 and the port 156. Passage 142 and thereby bellows chamber 160 will be vented to atmosphere by way of the bore 140 and the delivery chamber 141, as will be appreciated from preceding description.

When the pressure of fluid in the control chamber 175, corresponding to a certain temperature of the capillary tubes 133 and hence of the turbine gases, becomes sufficient to overcome opposition of the spring 185 the diaphragm 171 will be deflected in the direction of chamber 176 to cause engagement of stem 170 with the abutment 151, after which said stem and abutment in moving with continued slight additional deflection of the diaphragm will move seat element 150 into seating engagement with the exhaust valve 148, thereby closing off the delivery chamber 141, hence passage 142 and bellows chamber 160 to the atmosphere.

In employing the device 4 to prevent increase in temperature of the turbine gases above a certain maximum allowed temperature, in a manner as will hereinafter be described, the needle valve 130 will be adjusted so that pressure of fluid in chambers 114 and 175 will cause closing of the exhaust valve 148 at a temperature of tubes 133 somewhat less than the maximum allowed temperature of the gases passing over the tubes. The needle valve 130 is so adjusted in order to assure that the anticipating relay portion be brought into operation before the maximum allowed temperature of the gases is reached as the temperature of the capillary tubes 133, hence pressure in connected chambers 114 and 175, will lag the temperature of the gases when the latter temperature is increasing rapidly.

When the pressure of fluid in chamber 175, corresponding to temperature of the capillary tubes 133, increases above that necessary to seat the exhaust valve 148, resultant further deflection of the diaphragm 171 against spring 145, through movement of the stem 170, abutment 151, attached seat element 150, and the stem 147, will cause unseating of the supply valve 143. Fluid under pressure from the supply chamber 110 will then flow by way of the unseated supply valve 143 and bore 140 into the delivery chamber 141 and control passage 142 and, by way of needle valve 161, into the bellows chamber 160 where the pressure of such fluid acting on the abutment 151 will act to oppose action of pressure of fluid in chamber 175 acting on diaphragm 171. When the pressure of fluid in the bellows chamber 160 acting on abutment 151, together with action of springs 145 and 185, becomes sufficient to overcome action of the pressure of fluid in the chamber 175, the abutment 151 will move in the direction of chamber 155, carrying the stem 170 with it and thereby allowing spring 145 to seat the supply valve 143 while the exhaust valve 148 remains seated. Pressure of fluid in the passage 142 and delivery chamber 141 is thus held by closure of the supply valve 143.

When the temperature of the hot gases passing over the tubes 133 increases slowly, the temperature of these tubes will be the same as that of the gases and will increase at the same relatively slow rate, and, it will be appreciated, that the pressure of fluid in chambers 114 and 175 therefore will be directly proportional to the temperature of the hot gases and will increase at the same slow rate. Under these conditions, once the supply valve 143 is unseated by action of pressure of fluid in chamber 175, resultant flow of fluid from the supply chamber 110 into passage 142 will have sufficient time to flow into the bellows chamber 160 to increase the pressure of fluid therein at the same rate as the increase in pressure in chamber 175, and the action of such pressure in chamber 160 on abutment 151 will be such as will maintain the valve 143 positioned to maintain pressure of fluid in passage 142 in direct proportionality to pressure of fluid in chamber 175, hence in direct proportionality to the temperature of the tubes 133 and therefore of the hot gases, in the present instance.

When the temperature of the hot gases increases very rapidly, there may be instantaneous differences between the temperature of the tubes 133 and that of the gases as the tubes warm up to gas temperature. The temperature of the tubes 133, hence pressure of fluid in chambers 114 and 175, under the assumed condition, will therefore no longer be directly proportional to the rapidly increasing temperature of the hot gases. The rate of increase in temperature of the tubes 133, hence the rate of increase in pressure in chambers 114 and 175, will reflect the discrepancy between the temperature of the tubes and the temperature of the gases, in other words, the rate at which the temperature of the tubes 133 and the pressure in chambers 114 and 175 will change in a given instant is a measure of the amount of difference between the temperature of the tubes and that of the gases and so indicates the temperature toward which the tubes are headed. Then, once the supply valve 143 is initially unseated by action of the pressure of fluid in chamber 175 which is increasing in rate as above described, fluid under pressure will flow into the passage 142 and by way of the needle valve 161, will flow into the bellows chamber 160 to oppose the action of pressure of fluid in chamber 175. By virtue of the needle valve 161, a sufficient restriction to path of flow will be imposed on fluid flowing from passage 142 to bellows chamber 160 that the instantaneous pressure of fluid supplied to passage 142 will exceed that in the bellows chamber 160. The amount that the pressure of fluid in passage 142 is allowed to exceed pressure of fluid in the bellows chamber 160 will depend upon the rate of change in pressure in chamber 175, hence rate of change in temperature of the tubes 133, which, as previously mentioned, was an indication of the gas temperature toward which the tubes were headed. By proper adjustment of the needle valve 161, the pressure of fluid in passage 142 will be substantially maintained at a direct proportionality to the rapidly changing temperature of the turbine gases even though the temperature of the tubes 133 lags that of the gases by a substantial time interval.

Conversely, with both the supply valve 143 and the exhaust valve 148 closed to hold a pressure of fluid in passage 142 in accord with a stable temperature of tubes 133, when the temperature of the gases drops slowly, the temperature of the tubes 133 will be that of the gases and will drop correspondingly as will pressure of fluid in the chambers 114 and 175. Such reduction in pressure in the chamber 175 will allow spring 185 and pressure of fluid in bellows chamber 160 to effect movement of abutment 151 so that seat element 150 will leave the exhaust valve 148. Fluid under pressure will then release from bellows chamber 160 and passage 142 at substantially the same rate until pressure of fluid in chamber 175 is again preponderant over force of spring 185 and pressure of fluid in the bellows chamber 160, whereupon, through deflection of diaphragm 171, movement of stem 170 in engagement with abutment 151 will cause reseating of element 150 on valve 148.

If, reduction in temperature of the turbine gases occurs at a rate faster than can be followed by the tubes 133, such reduction, reflected by a pressure drop in the chamber 175, will result in unseating of the element 150 from exhaust valve 148 to allow for reduction in pressure in passage 142. The action of needle valve 161 on release of fluid under pressure from the bellows chamber 160 will be such as to allow pressure of fluid in the passage 142 to reduce in direct proportionality with reduction in temperature of the turbine gases in anticipation of the temperature toward which the temperature of the tube 133 is headed as indicated by the rate of change of the latter temperature.

Whether or not the drop in temperature of the tubes 133, hence drop in pressure in chamber 175, occurs rapidly, once the pressure of fluid in chamber 175 drops and remains below the value required to maintain the seat element 150 in engagement with valve 148 against opposition of spring 185 and pressure in bellows chamber 160, the diaphragm 171 will deflect in the direction of chamber 175 to allow element 150 to unseat and remain unseated from valve 148, venting passage 142 to atmosphere via chamber 141, passage 162, chamber 155 and port 156.

Summarizing, it will be seen that the device 4 will respond to an increase in temperature of the turbine gases above a desired maximum value to effect supply of fluid to control passage 142 at a pressure or pressures directly proportional to the temperature of such gases, whether increasing or decreasing above said maximum value and will respond to a decrease in temperature of the gases below the maximum value to effect venting of the control passage 142 to atmosphere.

*Description of integrating valve device 5*

The integrating valve device 5, for sake of illustration, schematically, comprises a casing 200 having a supply chamber 201, a delivery chamber 202 and an exhaust chamber 203 open to atmosphere. Supply and exhaust ports 204, 205, respectively, are formed in partitions at opposite ends of the delivery chamber 202 which separates same from the supply chamber 201 and the delivery chamber 203, respectively. By way of these ports the delivery chamber 202 may communicate with either the supply chamber 201 or the exhaust chamber 203. A valve 206 in the shape of a ball is disposed in the delivery chamber 202 for controlling the degree of opening and closing simultaneously of the delivery chamber 202 to the supply and exhaust chamber 201 and 203 according to proximity of the valve to the ports 204, 205. Two oppositely extending valve stems 208 and 209 are attached diametrically opposite to the valve 206. The stem 208 extends through the port 204 and the supply chamber 201 and slidably fits in an accommodating socket at its projecting end. The stem 209 extends through the port 205, chamber 203, and outwardly through an accommodating opening in the casing 200. Both the stems 208 and 209 are of lesser diameter than the diameter of openings 204 and 205 to allow a path for flow of fluid under pressure when the valve 206 is unseated and the ports 204, 205 are therefore open. A light compression spring 210 disposed in supply chamber 201, is arranged to bias the stem 208 in a direction urging the valve 206 toward port 205. One end of the compression spring 210 abuts an annular face defining an end wall of chamber 201 while the opposite end abuts an annular shoulder formed by a washer element attached to the stem 208. A compression spring 212 is interposed between a yieldable stop element 214 and an annular face formed in a sleeve 216 attached to an adjustable spring seat element 218. The stop element 214 is attached to a rod 220 one end of which abuts the projecting end of the stem 209 while its other end slidably fits in the sleeve 216 and is guided thereby. A washer element 221 attached to rod 220 is arranged to engage sleeve 216 and thereby define a yieldable stop position of the rods 209 and 220 and element 214.

The casing 200 is attached to a movable abutment 225 which is rigidly connected to another movable abutment 226 by means of rigid elements 227. The abutments 225 and 226 are spaced apart and each may be disk-shaped of equal size provided with radially extending arms 228 to which opposite ends of the rigid elements 227 are connected. Disposed intermediate the movable abutments 225 and 226 in alignment therewith and of equal size is a disk-shaped fixed abutment 230 which is adapted to be fixed relative to abutment 225 and 226; mounting flanges 232 being provided at opposite peripheral edges of the abutment 230. The flanges 232 are provided with bolt or screw holes to allow for securing same to a fixed mounting member (not shown). A second disk-shaped fixed abutment 235 is disposed on the opposite side of movable abutment 226 in alignment therewith and of equal size. Abutment 235 is provided with a flange 236 having bolt or screw holes which adapt it for attachment to the same mounting member to which abutment 230 is attached. Intermediate the abutments 235 and 226 a speed compensating chamber 240 is formed which is defined at its peripheral edge by a bellows 241 attached and sealed at its opposite ends to said abutments and allowing for movement of abutment 226 toward and away from abutment 235. A speed control chamber 243 is formed between abutments 226 and 230. A bellows 244, defines the peripheral wall of chamber 243, attached and sealed at its opposite ends to the peripheral edge of abutments 226 and 230, and allows for facile movement of abutment 226 toward and away from the abutment 230. A temperature compensating chamber 245 is formed between the abutments 230 and 225. A bellows 246 is attached and sealed at its opposite ends to abutments 225 and 230 to define the peripheral wall of chamber 245 while allowing for facile reciprocable movement of the abutment 225 relative to the abutment 230.

In the integrating valve device 5, the speed compensating chamber 240 is constantly connected to the delivery chamber 87 in the speed responsive control valve device 3 by way of a pipe 270 and corresponding passage in the abutment 235; the speed control chamber 243 is connected to the delivery chamber 42 in the operator's control valve device 2 by way of a pipe 271 and corresponding passage in the abutment 230; the temperature compensating chamber 245 is connected to the control passage 142 in the temperature responsive valve device 4 by way of a pipe 272 and a corresponding passage in the abutment 230; the supply chamber 201 is connected to a branch of the pipe 271 by way of a pipe 273 and the interlock valve device 6; and the delivery chamber 202 is connected to the control chamber 26 in the fuel control valve device 1 by way of a pipe 275.

*Operation of integrating valve device 5*

It will be seen that, with movable abutments 225 and 226 rigidly connected one with the other in sandwich fashion with respect to the fixed abutments 235 and 230, pressure of fluid in both the speed compensating chamber 240 and in the temperature compensating chamber 245 will oppose action of pressure of fluid in the speed control chamber 243. When equilibrium is established between the pressure of fluid in the speed control chamber 243 and the summation of pressures of fluid in the speed and temperature compensating chambers 240 and 245, the bellows 241, 244, and 246 will be in their neutral positions in which they are shown in the drawing, with the abutments 225, 226 and casing 200 also so disposed. Under the above conditions, assume the spring seat element 218, and therefore stop element 214, to be fixed and to be in what hereinafter will be referred to as a neutral position in which it is shown in the drawing, the spring 210 will urge the stem 209 into engagement with the yieldable stop element 214 which remains in its neutral position. The ball valve 206 will be disposed in a position in chamber 202 intermediate the supply and exhaust ports 204 and 205, in which position the valve is shown in the drawing, with the delivery chamber 202 consequently open to both the supply chamber 201 and the exhaust chamber 203.

When the bellows 241, 244 and 246 are in their respective neutral positions, preponderance in pressure of fluid in the speed control chamber 243 over the summation of pressures of fluid in the speed and temperature compensating chambers 240 and 245 will cause upward movement, as viewed in the drawing, of the abutments 225, 226 and casing 200 against the tension-spring-like opposition of the bellows 244 and the compression-spring-like opposition of both the bellows 246 and the bellows 241. The degree of such upward movement of the casing 200 will depend upon the degree of such preponderance in pressure and the spring values of the three bellows.

Conversely, when the bellows 241, 244 and 246 are in their neutral positions, preponderance in summation of the pressures of fluid in both the speed and temperature compensating chambers 240 and 245 over the pressure in the speed control chamber 243 will cause downward movement, as viewed in the drawing, of the abutments 225, 226 and the casing 200 against the compression-spring-like opposition of the bellows 244 and the tension-spring-like opposition of both the bellows 241 and the bellows 246.

Upon equalization of pressure forces acting on movable abutments 225, 226 subsequent to movement thereof in either direction as above-described, the spring-like deflection forces of the bellows 241, 244 and 246 will return the abutments 225, 226 and casing 200 to their neutral positions in which they are shown in the drawing. "Partial equalization" of such pressure forces will allow "partial return."

It will be appreciated from the foregoing that the position which the casing 200 will be caused to assume away from neutral position in either direction is determined by the degree of difference between pressure in chamber 243 and the summation of pressures in chambers 240, 245.

Since the bias spring 210 urges the stem 209 to maintain engagement with stop element 214, upward movement or downward movement of the casing 200 from its neutral position in which it is shown in the drawing will tend to cause closure of the exhaust port 205 or of the supply port 204, respectively, through engagement of a valve 206 with respective seats formed in the casing encircling these ports. Once the valve 206 engages either of the above seats, continued movement of the casing 200 in the same direction causing such engagement will carry the valve with it; continued upward movement causing stem 209 to leave stop element 214, and continued downward movement carrying said stop element with the stem and compressing spring 212. Return of casing 200 to its neutral position will allow springs 210 and 212 to return valve 206 to its neutral position in which it is shown in the drawing.

Closure of the supply port 204 by valve 206 closes off the delivery chamber 202 from the supply chamber 201, while closure of the exhaust port 205 by said valve closes off the delivery chamber from the exhaust chamber 203.

It will be seen then that preponderance in pressure in the speed control chamber 243 over the sum of the pressures in chambers 240, 245 will cause closure of the exhaust port 205 while the supply port 204 remains open; while a preponderance in pressure in reverse order will cause closing of the supply port 204 with the exhaust port 205 open.

*Description of dampening portion of integrating valve device 5*

To modify operation of the valve 206 and prevent overshooting and undershooting the pressure of fluid supplied to pipe 275, a dampening mechanism is provided.

The dampening mechanism comprises two spaced apart movable abutments 300, 301 rigidly connected one with the other by means of such as a plate 302. The abutments 300 and 301 are disposed at opposite sides of the spring seat element 218 which also is in the form of a flat plate in slidable engagement with the plate 302. The plate 302 is operatively connected to the spring seat element 218 through the medium of a slot 304 in an adjustable element 305 attached to the plate 302 and a roller 306 rotatably attached to said seat element for vertical movement therewith and while permitting rolling contact of said roller with the walls of the slot 304. The element 305 is fixed to plate 302 by means (not shown) which may be loosened to allow the element to be turned to properly orient the slot 304 for proper travel of the roller 306. At opposite ends of the mechanism are provided respective fixed elements 310 and 311 of the same size as and in alignment with the movable abutments 300 and 301, all of which may be substantially disk-shaped. The fixed abutments 310 and 311 are provided with securing arms having bolt or screw holes 312 to allow for securing them to the same mounting member (not shown) to which abutments 230 and 235 are attached. A bellows 314 is provided attached at opposite ends to the abutments 300 and 310 at their peripheral edges to define a chamber 315, while a similar bellows 316 is attached at its opposite ends to the abutments 301 and 311 in like fashion to define a chamber 317. The chamber 317 is connected to the delivery chamber 202 by way of a branch of the pipe 275, a corresponding passage in the fixed abutment 311 and an adjustable needle valve 325 arranged to control the size of opening available for flow of fluid under pressure from passage 275 into the chamber 317. The chamber 315 is connected to the chamber 317 by way of a pipe 328 and corresponding passages 328a and 328b in the abutments 310 and 311, respectively. An adjustable needle valve 330 in abutment 310 is provided to regulate the size of opening available for flow of fluid under pressure into and out of chamber 315 to and from passage 329a.

*Operation of dampening portion of integrating valve device 5*

In operation of the dampening mechanism, in response to preponderance in pressure of fluid in the chamber 317 over that in the chamber 315 will cause movement of the abutment 301, and thereby plate 302 and abutment 300 in the direction of chamber 315. Such movement of the plate 302 will carry the element 305 with it and cause the slot 304 to be moved in the same direction. Such movement of the slot 304 will cause upward movement of the seat element 218 and stem 209, as viewed in the drawing, thereby causing the valve 206 to be moved toward the supply port 204 to reduce or close off the area available for flow of fluid under pressure from the supply chamber 201 to the delivery chamber 202. Conversely, a preponderance in pressure of fluid in the chamber 315 over that in the chamber 317 will cause movement of the abutment 300, hence abutment 301 and plate 302, in the opposite direction toward chamber 317. Such movement of the plate 302 in carrying the element 305 with it will cause the slot 304 to be moved in the same direction, moving the roller 306, hence seat element 218, downwardly as viewed in the drawing. Downward movement of seat element 218 will allow stem 209 and valve 206 to follow it, opening supply port 204 and tending to or closing off exhaust port 205.

The dampening mechanism will be so tuned by adjustment of needle valves 325 and 330 that it will move valve 206 toward the supply port 204 according to the rate of increase in pressure in pipe 275 to prevent excessive overshooting of such pressure, and will move valve 206 toward the exhaust port 205 according to rate of decrease in pressure in the pipe 275 to prevent excessive undershooting of such pressure.

*Description of interlock valve device 6*

The interlock valve device 6 may be substantially like the fuel control valve device 1 in structure. Schematically, the interlock valve device 6 may comprise a casing 400 having an inlet chamber 401 connected to a branch of the pipe 271 and an outlet chamber 402 connected to the pipe 273. A valve 403, disposed in the inlet chamber 401, is provided for controlling communication between the inlet chamber 401 and the outlet chamber 402 by way of a bore 404 extending through a casing partition which separates the two chambers. The valve 403 is attached to a fluted stem 405 which extends through in slidable engagement with the wall of the bore 404. The valve 403 is urged by a spring 406 toward a casing seat encircling the end of the bore 404 which opens into chamber 401. To act as a medium through which the valve 403 may be unseated to open chamber 402 to chamber 401 a stem 408 is provided. The stem 408 is attached at its one end to the fluted stem 405, thereby to the valve 403, and projects through an accommodating bore 409 opening through a casing partition 410 which separates the outlet chamber 402 from chamber 411 which is constantly open to atmosphere by way of a port 412 in the casing. In the chamber 411, the stem 408 is attached to a diaphragm follower 415 which is secured for movement with deflection of a diaphragm 416 which is clamped at its outer periphery between two portions of the casing. The diaphragm 416 is subject opposingly to atmospheric pressure in the chamber 411 at its one side and to pressure of fluid in a control chamber 417 on its opposite side. A compression spring 418 is disposed in the chamber 411 and is arranged to bias the diaphragm 416 toward engagement with an annular seat ring 420 which encircles an opening in the wall of chamber 417 which is connected to a branch of the pipe 270.

*Operation of interlock valve device 6*

When pressure of fluid in the pipe 270 acting on diaphragm 416 within the area of ring 420 is sufficiently great to overcome action of the spring 418, the diaphragm 416 will move away from the seat ring, allowing the entire chamber 417 to be pressurized, whereupon the diaphragm 416 will rapidly deflect to its maximum extent, unseating the valve 403 and fully opening the outlet chamber 402 to the inlet chamber 401. Upon a certain subsequent reduction in pressure of fluid in the chamber 417, the spring 418 will return the diaphragm 416 into engagement with the seat ring 420, allowing the spring 406 to seat the valve 403, thereby closing the outlet chamber 402 to the inlet chamber 401.

The same type of opening through the stem 408 and bellows arrangement as that described in connection with the fuel control valve device 1 may be provided in the device 6 to allow for facile movement of the stem 408, eliminating the usual sealing rings.

Operation of control apparatus

Assume that the turbo-jet engine is idle and that it is desired to operate same. Assume also that the reservoir 43 is charged with fluid under pressure, as therefore will be the supply pipe 44, as therefore will be chambers 41, 81 and 110 in the operator's control valve device 2, in the speed responsive valve device 3, and in the temperature responsive valve device 4, respectively. Assume that the handle 75 of the operator's control valve device 2 is in its "Zero thrust" position, in which case the pipe 271, hence the control chamber 243 in the integrating valve device 5, will be vented to atmosphere by way of the device 2, as will be appreciated from previous description. Since the turbo-jet engine is assumed to be idle, the head 95 of the speed responsive valve device 3 will also be idle so that the pipe 270, hence the control chamber 417 in the interlock valve device 6 and the speed compensating chamber 240 in the integrating valve device 5, will be vented to atmosphere by way of the said speed responsive device, as will be appreciated from previous description. With its control chamber 417 vented, the interlock valve device 6 will assume the position in which it is shown in the drawing, closing off the pipe 273 to the pipe 271. Also, since the engine is idle, the turbine inlet temperature will be low so that the control pipe 272, hence the temperature compensating chamber 245 in the integrating valve device 5, will be vented to atmosphere by way of the temperature sensitive valve device 4, as will be appreciated from previous description of the latter device. The pipe 275, hence the control chamber 26 in the fuel control valve device 1, will be vented to atmosphere by way of the integrating valve device 5, since its chambers 202, 240, 243 and 245 are vented to atmosphere. The casing 200 and valve 206 will be in their respective neutral positions, as will be appreciated from previous description, as also will be the seat element 218, since pipe 275 is vented. With its control chamber 26 vented, the fuel control valve device 1 will be in the position in which it is shown in the drawing, closing off the fuel supply pipe 9 from the combustion chamber delivery pipe 11.

Assume now that it is desired to start and to operate the turbo-jet engine. The turbine and compressor will be turned over by means not shown and the operator will move the operator's handle 75 out of "Zero Thrust" position to some position in the direction of "Full Thrust," whereupon the device 2 will respond to supply fluid to pipe 271 at a certain pressure in accord with the position of said handle. Such fluid under pressure in pipe 271 will flow to the control chamber 243 in integrating valve device 5 to cause opening the supply port 204 and closure of exhaust port 205 while the speed responsive valve device 3 responds to turning over of the engine to effect supply of fluid to the chamber 417 in device 6 and to the chamber 240 in the integrating valve device at increasing pressures directly proportional to the increasing speed of rotation of the engine. With the chamber 201 in the integrating valve device 5 cut off from the source of fluid under pressure, such as the pipe 271, by the device 6, even with the supply port 204 in device 5 open, the control chamber 26 in the fuel control valve device 1 will remain devoid of fluid under pressure so that the fuel will remain cut off to the engine. When the turbo-jet engine being turned over by the starting means (not shown) attains a speed such as 3000 r. p. m., for example, the resultant increase in pressure of fluid from the speed responsive valve device 3 in the control chamber 417 in device 6 will be sufficient to unseat valve 403 to open the pipe 273 to the source of fluid under pressure such as present in pipe 271. Fluid under pressure will then flow via the pipe 273, chambers 201 and 202 in the integrating valve device 5, and the pipe 275 into the control chamber 26 in the fuel control valve device 1 to cause the valve 12 to be opened to allow fuel to flow from pipe 9 into pipe 11 to the turbo-jet engine's combustion chamber at a rate commensurate with the degree of pressure of the fluid supplied to the chamber 26. Such fuel will be ignited in the combustion chamber to generate hot expansible gases which operate the engine, whereupon the starting means will be cut off. So long as the supply port 204 in the integrating valve device 5 remains open, fluid from pipe 273 will flow to the control chamber 26 in the fuel control valve device 1, increasing the pressure therein and causing a corresponding increase in rate of fuel supply to the engine whose speed will increase accordingly. In response to increase in engine speed, the device 6 will increase the pressure of fluid supplied to the speed compensating chamber 240 in the integrating valve device 5. When the speed of the engine becomes great enough, the pressure of fluid in the chamber 240 in device 5 will equalize with that in the control chamber 243, causing movement of the casing 200 to a position wherein the valve 206 will occupy an equilibrium position intermediate the supply and exhaust ports 204 and 205 such that the pressure of fluid in the control chamber of the fuel control valve device 1 will be held at the pressure which allows the desired rate of fuel flow to the engine to maintain its speed of operation in accord with the desired speed as called for by pressure of fluid in the integrating valve device chamber 243 and by position of the operator's handle 75. Since thrust produced by the turbo-jet engine is a function of speed, the position of the handle may be graduated in terms of thrust.

In like manner, by movement of the operator's handle 75 toward up to "Full Thrust" position, the pressure of fluid in the integrating valve device speed control chamber 243 will be increased up to a maximum value to shift casing 200 to close exhaust port 205 allowing fluid under pressure from pipe 273 to flow to the control chamber of the fuel control valve device 1 to increase fuel supply to the engine until the resultant increase in its operational speed causes a corresponding increase in the pressure of fluid in the integrating valve device speed compensating chamber 240 sufficient to balance off the increased pressure in chamber 243 whereupon casing 200 will again be returned to a position in which the valve 206 will be so disposed relative to supply and exhaust ports 204 and 205 as to maintain the pressure in the fuel control valve device chamber 26 at the proper value necessary to hold the proper balancing pressure in the integrating valve device chamber 240. If, for any reason, the speed of operation of the engine should tend to increase above that called for by position of the operator's handle 75 and therefore by the pressure of fluid in the integrating valve device speed control chamber 243, any undesirable increase in engine speed will result in a corresponding increase in pressure of fluid in the integrating valve device speed compensating chamber 240 which will overcome action of pressure of fluid in the chamber 243 to move casing 200 in the direction tending to close the supply port 204 and to open the exhaust port 205 to reduce the pressure in the fuel control valve device control chamber 26 to so reduce fuel supply to the engine as to prevent such undesired increase in engine speed. In "Full Thrust" position of the operator's handle 75, a maximum engine speed of 12,500 r. p. m. for example, may be called for and the control apparatus will respond as above described to prevent an increase in operating speed above this value.

Should the operating temperature of the gas turbine comprised in the engine tend to exceed a chosen degree, such as 1750° F., for example, it will be appreciated from previous description that the temperature sensitive valve device 4 will respond to effect pressurization of the integrating valve device temperature compensating chamber 245 to such an extent that it will act with pressure of fluid in the speed compensating chamber 240 to overcome action of pressure of fluid in the speed control chamber 243 to so move the casing 200 as to position the supply port 204 closer to valve 206 and the exhaust port 205 further away from said valve to cause sufficient reduction in the fuel control valve device control chamber 26 as will effect reduction in fuel supply to the engine as will prevent the turbine operating temperature from exceeding the maximum desired value.

In response to movement of the operator's handle 75 in the return direction toward or to "Zero Thrust" position, pressure of fluid in the integrating valve device speed control chamber 243 will be reduced in degree in accord with degree of such movement. The reduction in pressure in chamber 243 will result in preponderance in pressure of fluid in the speed compensating chamber 240 and resultant movement of the casing 200 relative to valve 206 as to further close the supply port 204 and to further open the exhaust port 205 so as to release sufficient fluid under pressure from the fuel control valve device control chamber 26 as will reduce the pressure of fluid therein to a value which will so regulate fuel supply to the engine that its speed, hence its thrust, will be commensurate with the reduced pressure of fluid in the speed control chamber 243. When pressure of fluid in the speed control and speed compensating chambers 243, and 240, again substantially equalize, an equilibrium position of the casing 200 relative to valve 205 will be established in which supply of fluid under pressure into chamber 202 from chamber 201 is properly balanced with release of fluid under pressure from chamber 202 into exhaust chamber 203 to maintain the proper pressure of fluid in the fuel control valve device control chamber 26 to hold the proper rate of fuel supply, hence engine speed, which will maintain the proper balancing pressure in the integrating valve device speed compensating chamber 240 as will maintain such equilibrium position of the casing 200.

*Summary*

It will now be seen that I have provided a fluid pressure control apparatus for controlling the thrust-output of a gas turbo-jet engine. By means of such apparatus, the thrust may be accurately controlled and means are provided in the apparatus which will prevent the speed and temperature of operation of the gas turbine from becoming excessive.

Having now described my invention, what I claim as new and desire to secure by Letters Patent, is:

1. Fuel control apparatus for a fuel burning engine comprising in combination, valve means for regulating flow of fuel to said engine, control means comprising movable abutment means subject opposingly to two different fluid pressures and arranged for operation by a preponderance in one to effect operation of said valve means to increase supply of fuel to said engine and upon balancing of the one by the other to prevent further supply of fuel to said engine, an operator's control valve device for providing said one fluid pressure on said abutment means, and means responsive to engine operating temperature above and below a certain value to establish and disestablish, respectively, the other of said two fluid pressures on said abutment means.

2. Fuel control apparatus for a fuel burning variable speed engine comprising in combination, valve means for regulating supply of fuel to said engine, means including an operator's control device for effecting operation of said valve means to supply fuel to said engine, control means controlling the operative connection between said operator's control device and said valve means, and means responsive to speed of said engine for effecting operation of said control means to disestablish and establish said operative connection below and above, respectively, a chosen speed of said engine.

3. Fuel control apparatus for a fuel burning variable speed engine comprising in combination with a source of fuel under pressure and a source of control fluid under pressure, fuel control valve means for regulating supply of fuel from said source of fuel to said engine, a valve device controlled by two opposing pressures operative by preponderance of one to effect operation of said valve means to increase supply of fuel to said engine and by balancing against the other to limit the supply of fuel according to said one pressure, an operator's control device controlling communication between said source of control fluid and said valve device for increasing said one pressure, speed responsive means driven by the engine, and other valve means operative by said speed responsive means and controlling communication between said source of control fluid and said valve device for increasing said other pressure in accord with increase in speed of said engine.

4. Fuel control apparatus for a fuel burning variable speed engine comprising in combination with a source of fuel under pressure and a source of control fluid under pressure, fuel control valve means for regulating supply of fuel from said source of fuel to said engine, a valve device controlled by two opposing pressures operative by preponderance of one to effect operation of said valve means to increase supply of fuel to said engine and by balancing against the other to limit the supply of fuel according to said one pressure, an operator's control device controlling communication between said source of control fluid and said valve device for increasing said one pressure, speed responsive means driven by the engine, other valve means operative by said speed responsive means and controlling communication between said source of control fluid and said valve device for increasing said other pressure in accord with increase in speed of said engine, and means subject to said other pressure to prevent operation of said fuel control valve means to supply fuel to said engine when said other pressure is less than a chosen degree.

5. Fuel control apparatus for a variable speed fuel burning engine, comprising in combination with a source of fluid under pressure, a fuel control valve device having a fuel supply inlet adapted to be connected to a source of fuel under pressure and a fuel supply outlet adapted to be connected to said engine and comprising means for controlling the degree of opening of said outlet to said inlet according to degree of pressure of fluid in a control chamber; an operator's control valve device having a supply chamber connected to said source of fluid under pressure, a delivery chamber, and an exhaust chamber open to atmosphere and comprising means controlling communication between said chambers to regulate degree of pressure of fluid in its delivery chamber according to position of an operator's handle, a speed responsive valve device adapted to be driven by said engine and having a supply chamber connected to said source, an exhaust chamber open to atmosphere, and a delivery chamber and comprising means controlling communication between its chambers to regulate the degree of pressure in its delivery chamber according to speed of operation of said engine, and an integrating valve device having a delivery chamber connected to the control chamber in said fuel control valve device, an exhaust chamber open to atmosphere, a supply chamber and a speed control chamber both connected to the delivery chamber in said operator's control valve device, and a speed compensating chamber connected to the delivery chamber in said speed responsive valve device, said integrating valve device comprising means including valve means to control opening and closing of its deliery chamber to its supply and exhaust chambers according to degree of differential in pressures in its speed control and speed compensating chambers.

6. Fuel control apparatus for a variable speed fuel burning engine, comprising in combination with a source of fluid under pressure, a fuel control valve device having a fuel supply inlet adapted to be connected to a source of fuel under pressure and a fuel supply outlet adapted to be connected to said engine and comprising means for controlling the degree of opening of said outlet to said inlet according to degree of pressure of fluid in a control chamber; an operator's control valve device having a supply chamber connected to said source of fluid under pressure, a delivery chamber, and an exhaust chamber open to atmosphere and comprising means controlling communication between said chambers to regulate degree of pressure of fluid in said delivery chamber according to position of an operator's handle, a speed responsive valve device adapted to be driven by said engine and having a supply chamber connected to said source, an exhaust chamber open to atmosphere, and a delivery chamber and comprising means controlling communication between its chambers to regulate the degree of pressure in said delivery chamber according to speed of operation of said engine; and an integrating valve device having a delivery chamber connected to the control chamber in said fuel control valve device, an exhaust chamber open to atmosphere, a supply chamber and a speed control chamber both connected to the delivery chamber in said operator's control valve device, and a speed compensating chamber connected to the delivery chamber in said speed responsive valve device, said integrating valve device comprising means including valve means to control opening and closing of its delivery chamber to its supply and exhaust chambers according to degree of differential in pressure in its speed control and speed compensating chambers, and dampening means associated with said valve means sensitive to rate of change of pressure in the delivery chamber of said integrating valve device to prevent overshooting and undershooting of such pressure.

7. Fuel control apparatus for variable speed fuel burning engine, comprising in combination with a source of fluid under pressure, a fuel control valve device having a fuel supply inlet adapted to be connected to a source of fuel under pressure and a fuel supply outlet adapted to be connected to said engine and comprising means controlling the degree of opening of said outlet to said inlet according to degree of pressure of fluid in a control chamber; an operator's control valve device having a supply chamber connected to said source of fluid under pressure, a delivery chamber, and an exhaust chamber open to atmosphere and comprising means controlling communication between said chambers to regulate degree of pressure of fluid in said delivery chamber according to position of an operator's handle, a speed responsive valve device adapted to be driven by said engine and having a supply chamber connected to said source, an exhaust chamber open to atmosphere, and a delivery chamber and comprising means controlling communication between its chambers to regulate the degree of pressure in its delivery chamber according to speed of operation of said engine; a temperature responsive valve device having a supply chamber connected to said source, an exhaust chamber connected to atmosphere, and a delivery chamber and comprising means adapted to sense the temperature of hot gases in said engine to control communication between its delivery chamber, supply chamber, and exhaust chamber to regulate the degree of pressure in its delivery chamber according to temperature of operation of the engine; and an integrating valve device having a delivery chamber connected to the control chamber in said fuel control valve device, an exhaust chamber open to atmosphere, a supply chamber and a speed control chamber both connected to the delivery chamber in said operator's control valve device, a speed compensating chamber connected to the delivery chamber in said speed responsive valve device, and a temperature compensating chamber connected to the delivery chamber in said temperature responsive valve device, said integrating valve device comprising means including valve means to control communication between its delivery chamber and its supply and exhaust chambers according to degree of differential in pressure between its speed control chamber and its speed and temperature compensating chambers.

References Cited in the file of this patent

UNITED STATES PATENTS

| Number | Name | Date |
|---|---|---|
| 2,227,666 | Noack | Jan. 7, 1941 |
| 2,404,428 | Bradbury | July 23, 1946 |
| 2,422,808 | Stokes | June 24, 1947 |
| 2,474,033 | Chamberlin et al. | June 21, 1949 |
| 2,479,813 | Chamberlin et al. | Aug. 23, 1949 |
| 2,485,514 | Sturrock | Oct. 18, 1949 |
| 2,499,232 | Strub | Feb. 28, 1950 |
| 2,503,048 | Ifield | Apr. 4, 1950 |
| 2,520,547 | Hughes | Aug. 29, 1950 |
| 2,521,736 | Mallory | Sept. 12, 1950 |
| 2,524,445 | Ifield et al. | Oct. 3, 1950 |
| 2,531,780 | Mock | Nov. 28, 1950 |
| 2,535,202 | Gregory et al. | Dec. 26, 1950 |
| 2,538,582 | Mordell et al. | Jan. 16, 1951 |
| 2,544,427 | Ifield et al. | Mar. 6, 1951 |
| 2,581,275 | Mock | Jan. 1, 1952 |
| 2,581,276 | Mock | Jan. 1, 1952 |

FOREIGN PATENTS

| Number | Country | Date |
|---|---|---|
| 620,161 | Great Britain | Mar. 21, 1949 |
| 634,095 | Great Britain | Mar. 15, 1950 |